(12) United States Patent
Katzenstein

(10) Patent No.: US 11,174,409 B2
(45) Date of Patent: Nov. 16, 2021

(54) COATED METAL FOOD CONTAINER ARTICLE

(71) Applicant: Dow Global Technologies LLC, Midland, MI (US)

(72) Inventor: Joshua M. Katzenstein, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 371 days.

(21) Appl. No.: 16/388,066

(22) Filed: Apr. 18, 2019

(65) Prior Publication Data

US 2019/0338156 A1 Nov. 7, 2019

Related U.S. Application Data

(60) Provisional application No. 62/664,985, filed on May 1, 2018.

(51) Int. Cl.
| | | |
|---|---|---|
| *C09D 123/08* | (2006.01) | |
| *C09D 7/65* | (2018.01) | |
| *C09D 7/45* | (2018.01) | |

(52) U.S. Cl.
CPC ......... *C09D 123/0869* (2013.01); *C09D 7/45* (2018.01); *C09D 7/65* (2018.01)

(58) Field of Classification Search
None
See application file for complete search history.

(56) References Cited

U.S. PATENT DOCUMENTS

| | | |
|---|---|---|
| 8,722,787 B2 | 5/2014 | Romick et al. |
| 8,779,053 B2 | 7/2014 | Lundgard et al. |
| 2003/0187128 A1* | 10/2003 | Shiba ............... C08L 2666/20 524/556 |
| 2013/0130021 A1 | 5/2013 | Lundgard et al. |
| 2013/0149453 A1 | 6/2013 | Romick et al. |
| 2015/0147501 A1 | 5/2015 | Lindenmuth et al. |
| 2016/0122581 A1 | 5/2016 | You et al. |

FOREIGN PATENT DOCUMENTS

| | | | |
|---|---|---|---|
| EP | 3415688 | | 12/2018 |
| JP | 2003171513 A | * | 6/2003 |
| WO | 2014105466 | | 7/2014 |
| WO | 2017180895 | | 10/2017 |

OTHER PUBLICATIONS

JP2003171513 English Machine Translation, prepared Jun. 18, 2021. (Year: 2021).*
STN Abstract for JP2003171513, accessed Jun. 18, 2021. (Year: 2021).*
Search report from corresponding European 19171951.7 application, dated Nov. 1, 2019.

* cited by examiner

*Primary Examiner* — Christopher M Rodd
(74) *Attorney, Agent, or Firm* — Reid S. Willis

(57) ABSTRACT

The present invention relates to an article comprising a cured polymeric film superposing a metal, wherein the cured polymeric film comprises:
a) a base polymer comprising structural units of ethylene and a $C_1$-$C_4$-alkyl acrylate or methacrylate; and
b) a dispersant which is a copolymer comprising structural units of ethylene and a carboxylic acid monomer; wherein the cured film has a thickness in the range of from 0.5 μm to 25 μm.

The article provides a coating that is particularly resistant to absorption of flavor producing compounds such as limonene, thereby providing a more acceptable flavor profile interaction than state-of-the art polyolefin coated metals.

9 Claims, No Drawings

COATED METAL FOOD CONTAINER ARTICLE

The present invention relates to a coated metal food container article. Cans used to contain consumable food products, for example, carbonated soft drinks (CSDs), need to be coated to keep the contained food from metal pickup and to protect the can from oxidation. Consequently, the cans are coated to provide a barrier coating to protect both the food and the can. Current coatings, which are often epoxy coatings derived from bisphenol A, have flavor interactions with the food product that are well-accepted by consumers and manufacturers. However, continued use of materials made from bisphenol A in consumer products has come under scrutiny by various agencies and governments, thereby encouraging the search for an acceptable alternative coating material. One such alternative material is a film made from a polyolefin dispersion, such as described in U.S. Pat. No. 8,779,053. One of the challenges with state-of-the-art films prepared from polyolefin dispersions is that these films interact with the can and the food product differently from the incumbent films. Therefore, it would be an advance in the art of can coatings to discover a film that more closely matches the interactions of the incumbent resin material.

BACKGROUND OF THE INVENTION

Summary of the Invention

The present invention addresses a need in the art by providing an article comprising a cured polymeric film superposing a metal, wherein the cured polymeric film comprises:
a) a base polymer comprising structural units of ethylene and a $C_1$-$C_4$-alkyl acrylate or methacrylate, wherein the weight-to-weight ratio of the structural units of ethylene and the $C_1$-$C_4$-alkyl acrylate or methacrylate is in the range of from 99.8:0.2 to 50:50; and
b) a dispersant which is a copolymer comprising structural units of ethylene and a carboxylic acid monomer, wherein the copolymer has a melt flow index in the range of from 50 to 2000 g/10 min at 190° C., and the weight-to-weight ratio of structural units of ethylene to carboxylic acid monomer is in the range of from 95:5 to 70:30;
wherein the dispersant has a concentration in the range of from 9 to 50 weight percent based on the weight of the cured film; wherein the sum of the dispersant and the base polymer comprise from 10 to 100 percent of the weight of cured film; and wherein the film has a thickness in the range of from 0.5 μm to 25 μm. The article of the present invention addresses a need by providing a coated metal that gives a more acceptable flavor profile interaction than state-of-the art polyolefin coated metals.

DETAILED DESCRIPTION OF THE INVENTION

The present invention is an article comprising a cured polymeric film superposing a metal, wherein the cured polymeric film comprises:
a) a base polymer comprising structural units of ethylene and a $C_1$-$C_4$-alkyl acrylate or methacrylate, wherein the weight-to-weight ratio of the structural units of ethylene and the $C_1$-$C_4$-alkyl acrylate or methacrylate is in the range of from 99.8:0.2 to 50:50; and
b) a dispersant which is a copolymer comprising structural units of ethylene and a carboxylic acid monomer, wherein the copolymer has a melt flow index in the range of from 50 to 2000 g/10 min at 190° C., and the weight-to-weight ratio of structural units of ethylene to carboxylic acid monomer is in the range of from 95:5 to 70:30;
wherein the dispersant has a concentration in the range of from 9 to 50 weight percent based on the weight of the cured film; wherein the sum of the dispersant and the base polymer comprise from 10 to 100 percent of the weight of cured film; and wherein the film has a thickness in the range of from 0.5 μm to 25 μm. The article of the present invention addresses a need by providing a coated metal that gives a more acceptable flavor profile interaction than state-of-the art polyolefin coated metals.

The polymeric film is conveniently formed by applying an aqueous dispersion comprising a dispersant, a base polymer, and a neutralizing agent, which dispersion may be prepared by a continuous or batch process. An example of a preferred continuous process is twin screw extrusion, as described in U.S. Pat. No. 8,722,787, Comparative Example E. Alternatively, a batch process using, for example, with a 2CV Helicone mixer, which is a conical batch mixer that uses dual intermeshing conical blades to mix high viscosity materials. The concentration of polymer solids in the aqueous dispersion is preferably in the range from 20, more preferably from 25, and most preferably from 30 weight percent, to preferably 50 and more preferably to 45 weight percent, based on the concentration of water and base polymer.

The dispersant is a copolymer comprising structural units of ethylene and a carboxylic acid monomer such as acrylic acid, methacrylic acid, or itaconic acid. As used herein, the term "structural unit" of the named monomer refers to the remnant of the monomer after polymerization. For example, a structural unit of methyl methacrylate is as illustrated:

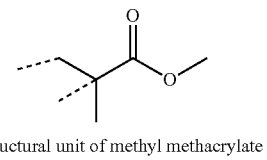

structural unit of methyl methacrylate where the dotted lines represent the points of attachment of the structural unit to the polymer backbone.

The dispersant has a melt flow index in the range of from 50 to 2000 g/10 min at 190° C. (according to ASTM D1238) and the weight-to-weight ratio of structural units of ethylene to carboxylic acid monomer is in the range of from 95:5, preferably from 90:10, and more preferably from 85:15 weight percent; to 70:30, and preferably to 75:25 weight percent, based on the weight of the copolymer. The concentration of the copolymer is preferably in the range of from 10, more preferably from 15 weight percent, to preferably to 40, more preferably to 30 weight percent, based on the weight of the cured film. Examples of suitable commercially available dispersants include Primacor 5980i and NUCREL™ 2806 Copolymer (A Trademark of The Dow Chemical Company or its Affiliates).

The base polymer is a copolymer comprising structural units of ethylene and a $C_1$-$C_4$-alkyl acrylate or methacrylate, wherein the weight-to-weight ratio of the structural units of ethylene to the $C_1$-$C_4$-alkyl acrylate or methacrylate is in the range of from 99.8:0.2, preferably from 99.7:0.3; and more preferably from 99.6:0.4; to 50:50, more preferably to 60:40; and most preferably to 65:35. Preferred base polymers include ethylene-co-methyl acrylate; ethylene-co-ethyl acrylate; and ethylene-co-butyl acrylate. Preferably, the concentration of the base polymer is preferably in the range of from 1, more preferably from 2, to 90, more preferably to 80, and most preferably to 75 weight percent, based on the weight of the cured film. Commercial examples of base polymers include: AMPLIFY™ EA103 Functional Polymer, ELVALOY™ AC34035 Ethylene butyl acrylate copolymer; and AC1609 Ethylene methyl acrylate copolymer. (AMPLIFY and ELVALOY are Trademarks of The Dow Chemical Company or its Affiliates.) The dispersant used to prepare the aqueous dispersion is advantageously neutralized with an organic base having a boiling point of less than 250° C., preferably ammonia or an amine; examples of suitable amines such as N,N-dimethylethanolamine, diethylamine, and morpholine.

The concentration of neutralizing agent is sufficiently high to neutralize at least half of the carboxylic acid groups in the dispersant. For example, if the dispersant comprises 0.05 mol of carboxylic acid groups, at least 0.025 mol of an amine such as N,N-dimethylethanolamine would be required. Thus, the ratio of base functionality in the neutralizing agent, preferably amine groups or ammonia, to carboxylic acid groups in the dispersant is at least 0.5:1. Preferably the ratio is in the range of from 0.7:1, more preferably from 0.9:1, more preferably from 1.1:1, and most preferably to 1.3:1; to preferably 3:1, more preferably to 2.5:1; and most preferably to 2.0:1.

The composition used to make the film may comprise other components including polymeric coupling agents to improve the compatibility between the dispersant and the base polymer. Examples of a suitable coupling agent include ethylene-co-maleic anhydride and polyolefin grafted with maleic anhydride, which, when used, is preferably present at a concentration in the range of from 5, more preferably from 10 weight percent to preferably 65, more preferably to 50, and most preferably to 30 weight percent based on the weight the cured film.

The composition used to make the film may further comprise non-functionalized ethylene polymers and copolymers such as high density polyethylene, as well as ethylene-co-alkene copolymers such as ethylene-co-propylene, ethylene-co-hexene, or ethylene-co-octene copolymers. These non-functionalized copolymers may be used at a concentration of up to 85 weight percent, based on the weight of the cured film. In one embodiment, the composition used to make the film comprises from 20 to 50 weight percent non-functionalized ethylene polymers or copolymers based on the weight of the cured film.

The composition may also comprise up to 5 weight percent, based on the weight of the cured film, of a wax such as ethylene bis(stearamide) and polyolefin waxes such as the commercially available Polywax 655 Polyethylene.

The composition can be applied to a metal substrate, for example, using a wire wound drawdown bar. The wet film can then heated to remove water, preferably to a temperature in the range of from 50° C., more preferably from 70° C. to preferably 250° C., more preferably 220° C. to provide a coat thickness in the range of from 0.5 µm, preferably from 1 µm, and more preferably from 2 µm to 25 µm, preferably to 15 µm, and more preferably to 10 µm. It is desirable in practice to remove as much neutralizing agent as possible during the heating (curing) process. Examples of preferred metals include aluminum, steel, and tin-plated steel.

Other suitable means for applying the composition to the metal substrate include spray coating and roller coating techniques well known in the art.

It has been discovered that a metal substrate coated with a polyolefin film as described hereinabove provides a more acceptable flavor profile interaction than state-of-the art polyolefin coated metals, as demonstrated by the below examples.

In the following examples and comparative example, EA103 refers to AMPLIFY™ EA103 Ethylene Ethyl Acrylate Polymer; 5980i refers to Primacor 5980i Copolymer; DMEA refers to dimethylethanolamine; MA-g-PE refers to Licocene 431 maleic anhydride grafted polyethylene wax; 8401 refers to ENGAGE™ 8401 Polyolefin Elastomer; 8402 refers to ENGAGE™ 8402 Polyolefin Elastomer; AC34035 refers to ELVALOY™ AC34035 Ethylene Butyl Acrylate Copolymer; AC1609 refers to ELVALOY™ AC1609 Ethylene Methyl Acrylate Copolymer, melt flow index=6, 9% acrylate; and AC12024S refers to ELVALOY™ AC12024S Ethylene Methyl Acrylate Copolymer, melt flow index=20, 24% acrylate. (ELVALOY and ENGAGE are Trademarks of The Dow Chemical Company or its Affiliates.)

EXAMPLES

Example 1—Preparation of an Aqueous Dispersion of Base Polymer, Dispersant, and Polymeric Coupling Agent at a 65:25:10 w/w/w Ratio The melt chamber of a 2CV Helicone mixer was preheated to 90° C. and then loaded with AC34035 (52.02 g), MA-g-PE polymeric coupling agent (8.00 g), and 5980i (20.02 g), for a mix composition of 65.0% AC34035, 10.0% MA-g-PE, and 25.0% 5980i. Deionized water (22.83 mL) and DMEA (12.71 mL, 200% neutralization) were also pre-loaded using an ISCO syringe pump. The components in the melt chamber were heated 143° C., at which temperature the mixer was started; the initial mixing speed was maintained at 43 rpm for 5 min then raised to 98 rpm for the remainder of the run. The material was white and uniform after 30 min of mixing. Dilution water was added with an ISCO pump at the rate of 1 mL/min for 30 min, then 1.5 mL/min for 56 min. The dilution was paused for 8 min during the second part of the addition. After the dilution was complete, the mixer was turned off and the contents were cooled. Once the temperature of the contents reached 88.6° C., the pressure in the chamber was slowly vented. The gate valve was opened and the material was collected (200.83 g, 88.01% recovery) and filtered before use.

All samples were prepared by formulating an aqueous polyolefin dispersion with a 0.69:1 w/w organic solid to solvent ratio, wherein the solvent was a 1:1 w/w mixture of n-butanol and Butyl CELLOSOLVE™ Ethylene Glycol Monobutyl Ether (A Trademark of The Dow Chemical Company or Its Affiliates). The formulation also contained Primid QM-1260 hydroxalkyl amide at a ratio of 0.42 equivalents of hydroxyl groups per acid groups of the aqueous dispersion. The final solid content was adjusted to 20 weight percent by addition of water containing 0.3 weight percent of neutralizing agent used to make the dispersion. These formulation were coated on both sides of aluminum coupons using a #16 wire wound draw-down bar. The films were then cured in a Despatch oven at 188° C. for 4 min for each side. Film thicknesses were measured using a Byko-Test MPOR.

Example 2—Preparation of an Aqueous Dispersion of Base Polymer, Dispersant, and Polymeric Coupling Agent at a 65:25:10 w/w/w Ratio This Example was prepared substantially as described in Example 1 except that AC1609 (51.99 g) was used in place of AC34035. The dispersion (188.90 g, 82.8% recovery) was collected and the material was filtered before use.

Example 3—Preparation of an Aqueous Dispersion of Base Polymer, Dispersant, Polymeric Coupling Agent, and 8401 at a 18:25:10:47 w/w/w/w Ratio EA103 (18 weight percent of polymer solids), 5980i (25 weight percent of polymer solids), MA-g-PE (10 weight percent of polymer solids), and 8401 (47 weight percent of polymer solids) were fed individually and concurrently from separate hoppers at the specified relative weights at a rate of 40 lbs polymer/h (18.1 kg/h) into a 25-mm Bersdorff ZE25 UTX extruder with 48 L/D. The extruder temperature profile was ramped to 180° C. prior to the introduction, through ISCO pumps, of water (72.7 mL/min) and DMEA (33.5 mL/min) separately and concurrently. Dilution water was then added to the extruded to adjust solids concentration to ~43 weight percent; the mixture was then cooled using a heat exchanger prior to exit. A back-pressure regulator was used at the extruder outlet to adjust the pressure in the extruder barrel.

Example 4—Preparation of an Aqueous Dispersion of Base Polymer, Dispersant, and Polymeric Coupling Agent at a 65:25:10 w/w/w Ratio This Example was prepared substantially as described in Example 1 except that AC12024S (51.99 g) was used in place of AC34035. The dispersion (158.53 g, 69.5% recovery) was collected and the material was filtered before use.

Comparative Example—Aqueous Dispersion Containing Polyolefin Particles not Functionalized with Structural Units of a $C_1$-$C_4$-Alkyl Acrylate CANVERA™ 1110 Polyolefin Dispersion (43 weight percent solids, A Trademark of The Dow Chemical Company or its Affiliates), is not functionalized with structural units of a $C_1$-$C_4$-alkyl Acrylate was used as a comparative against the present invention, all of which describe the preparation of aqueous dispersions of $C_1$-$C_4$-alkyl acrylate functionalized polyolefin particles.

Incubation and Extraction:

Samples were incubated in Coca Cola, 3 aluminum panels per glass jar, completely submerged for 7 d at 30° C. After incubation was complete, the panels were rinsed with DI water and then extracted using 15 mL methylene chloride per panel. Octadecane (5 ppm) was used as an internal reference standard.

Method for Determining Limonene Absorption

Absorption of limonene, a prominent contributor to the flavor of Coca Cola, was chosen a proxy for flavor absorption by the polyolefin coating. Absorption was measured by gas chromatography using an Agilent 7890 Series GC.

Table 1 shows Limonene absorption/μm (A/μm) in the aluminum panels submerged in Coca Cola.

Table 1

| Ex No. | Film Thickness (μm) | Comonomer | A/μm |
|---|---|---|---|
| 1 | 3.6 | Butyl Acrylate | 1.68 |
| 2 | 5.6 | Methyl Acrylate | 0.77 |
| 3 | 5.6 | Ethyl Acrylate | 0.66 |
| 4 | 4.8 | Methyl Acrylate | 1.07 |
| Comp. 1 | 5.1 | none | 2.64 |

Table 1-continued

Limonene Absorption in Al Panels

The results show that coatings prepared from an aqueous dispersion of a polyethylene functionalized with a $C_1$-$C_4$-alkyl acrylate shows superior resistance to absorption to the panels than the coating prepared from the aqueous dispersion of the unfunctionalized polyethylene. Coatings prepared from ethylene methyl acrylate and ethylene ethyl acrylate were especially resistant to absorption.

The invention claimed is:

1. An article comprising a cured polymeric film superposing a metal, wherein the cured polymeric film comprises:
   a) a base polymer consisting of structural units of ethylene and a $C_1$-$C_4$-alkyl acrylate or methacrylate, wherein the weight-to-weight ratio of the structural units of ethylene and the $C_1$-$C_4$-acrylate or methacrylate is in the range of from 99.8:0.2 to 50:50; and
   b) a dispersant which is a copolymer comprising structural units of ethylene and a carboxylic acid monomer, wherein the copolymer has a melt flow index in the range of from 50 to 2000 g/10 min at 190° C., and the weight-to-weight ratio of structural units of ethylene to carboxylic acid monomer is in the range of from 95:5 to 70:30;
   wherein the dispersant has a concentration in the range of from 9 to 50 weight percent based on the weight of the cured film; wherein the sum of the dispersant and the base polymer comprise from 10 to 100 percent of the weight of cured film; and wherein the film has a thickness in the range of from 0.5 μm to 25 μm.

2. The article of claim 1 wherein the cured film has a thickness in the range of from 1 μm to 15 μm; wherein the dispersant is a copolymer of ethylene and acrylic acid or methacrylic acid.

3. The article of claim 2 wherein the cured film has a thickness in the range of from 2 μm to 10 μm; wherein the carboxylic acid monomer is acrylic acid or methacrylic acid; wherein the concentration of structural units of ethylene to structural units of acrylic acid or methacrylic acid is in the range of from 90:10 to 75:25; and the concentration of the dispersant is in the range of from 10 to 40 percent based on the weight of the cured film.

4. The article of claim 3 wherein the weight-to-weight ratio of the structural units of ethylene and the $C_1$-$C_4$-alkyl acrylate or methacrylate is in the range of from 99.6:0.4 to 60:40; wherein the concentration of the base polymer is from 2 to 75 weight percent based on the weight of the cured film; and the base polymer comprising structural units of ethylene and the $C_1$-$C_4$-alkyl acrylate or methacrylate is ethylene-co-methyl acrylate, ethylene-co-ethyl acrylate, or ethylene-co-butyl acrylate.

5. The article of claim 1 wherein the cured film further comprises from 5 to 65 weight percent, based on the weight of the cured film, ethylene-co-maleic anhydride or ethylene grafted maleic anhydride or a combination thereof; and wherein the base polymer comprising structural units of ethylene and the $C_1$-$C_4$-alkyl acrylate or methacrylate is ethylene-co-methyl acrylate or ethylene-co-ethyl acrylate.

6. The article of claim 5 which wherein the cured film further comprises from 20 to 50 weight percent, based on the weight of the film, of an ethylene-co-propylene, an ethylene-co-hexene, or an ethylene-co-octene copolymer, or a high density polyethylene, or a combination thereof.

7. The article of claim 6 which wherein the cured film further comprises up to 5 weight percent, based the weight of the cured film, of a wax.

8. An article comprising a cured polymeric film superposing a metal, wherein the cured polymeric film comprises:
   a) a base polymer comprising of structural units of ethylene and a $C_1$-$C_4$-alkyl acrylate or methacrylate, wherein the weight-to-weight ratio of the structural units of ethylene and the $C_1$-$C_4$-alkyl acrylate or methacrylate is in the range of from 99.8:0.2 to 50:50; and
   b) a dispersant which is a copolymer comprising structural units of ethylene and a carboxylic acid monomer, wherein the copolymer has a melt flow index in the range of from 50 to 2000 g/10 min at 190° C., and the weight-to-weight ratio of structural units of ethylene to carboxylic acid monomer is in the range of from 95:5 to 70:30; and
   c) an ethylene-co-propylene copolymer, an ethylene-co-hexene copolymer, or an ethylene-co-octene copolymer, or a high-density polyethylene, or a combination thereof;
   wherein the dispersant has a concentration in the range of from 9 to 50 weight percent based on the weight of the cured film;
   wherein the ethylene-co-propylene copolymer, the ethylene-co-hexene copolymer, or the ethylene-co-octene copolymer, or the high-density polyethylene, or a combination thereof, has a concentration in the range of from 20 to 50 weight percent, based on the weight of the film; and
   wherein the sum of the dispersant and the base polymer comprise from 10 to 100 percent of the weight of cured film; and wherein the film has a thickness in the range of from 0.5 µm to 25 µm.

9. The article of claim 8 which wherein the cured film further comprises up to 5 weight percent, based the weight of the cured film, of a wax.

\* \* \* \* \*